US007976390B2

(12) United States Patent
Schneider et al.

(10) Patent No.: US 7,976,390 B2
(45) Date of Patent: Jul. 12, 2011

(54) AWARDING A BONUS BASED ON A MAXIMUM BONUS CYCLE TIME

(75) Inventors: Richard J. Schneider, Las Vegas, NV (US); Lawrence R. Pitman, Corvallis, OR (US); Michael B. Shelby, Corvallis, OR (US)

(73) Assignee: IGT, Reno, NV (US)

( * ) Notice: Subject to any disclaimer, the term of this patent is extended or adjusted under 35 U.S.C. 154(b) by 1694 days.

(21) Appl. No.: 11/086,256

(22) Filed: Mar. 21, 2005

(65) Prior Publication Data

US 2005/0215314 A1 Sep. 29, 2005

Related U.S. Application Data

(60) Provisional application No. 60/554,991, filed on Mar. 19, 2004.

(51) Int. Cl.
*A63F 9/24* (2006.01)
*A63F 13/00* (2006.01)
*G06F 17/00* (2006.01)

(52) U.S. Cl. .......................................... 463/42; 463/16

(58) Field of Classification Search .................... 463/27, 463/26, 42

See application file for complete search history.

(56) References Cited

U.S. PATENT DOCUMENTS

| | | | | |
|---|---|---|---|---|
| 5,941,773 | A * | 8/1999 | Harlick | 463/26 |
| 6,110,043 | A * | 8/2000 | Olsen | 463/27 |
| 6,146,273 | A * | 11/2000 | Olsen | 463/27 |
| 6,217,448 | B1 * | 4/2001 | Olsen | 463/25 |
| 6,375,569 | B1 * | 4/2002 | Acres | 463/27 |
| 7,029,395 | B1 * | 4/2006 | Baerlocher | 463/20 |
| 7,037,195 | B2 * | 5/2006 | Schneider et al. | 463/25 |
| 2003/0027638 | A1 * | 2/2003 | Schneider et al. | 463/42 |

FOREIGN PATENT DOCUMENTS

| | | |
|---|---|---|
| WO | WO 00/17825 | 3/2000 |
| WO | WO 03/045520 A1 | 6/2003 |

* cited by examiner

*Primary Examiner* — David L Lewis
*Assistant Examiner* — Reginald A Renwick
(74) *Attorney, Agent, or Firm* — Armstrong Teasdale LLP

(57) ABSTRACT

By awarding bonuses during predetermined bonus periods, gaming establishments can exercise greater control over bonus wins and, in doing so, can create player excitement and increase play during historically off-peak times, realizing greater revenue for the casino. The time based bonus begins when a maximum time for the bonus period is selected and divided into time increments, with each time increment having its own weight. A winning increment is randomly selected and a bonus is awarded when the time increment has been reached.

33 Claims, 7 Drawing Sheets

AWARDING A BONUS BASED ON A MAXIMUM BONUS CYCLE TIME

This application claims priority from U.S. Provisional Application No. 60/554,991, filed on Mar. 19, 2004, the contents of which are hereby expressly incorporated herein for all purposes.

TECHNICAL FIELD

This disclosure relates to networked gaming devices, and, more specifically, to a system for awarding bonuses based on a timed bonus cycle.

BACKGROUND OF THE INVENTION

Modern gaming machines are networked together, allowing functions such as game tracking, player tracking and bonusing. With the advent of networked gaming, casinos have been able to offer increased wagering opportunities for their patrons above the standard pay table of the games, for example, progressive jackpots or bonuses. Such jackpots have historically paid at random times to random machines upon the total accumulated value reaching a usually randomly chosen value and being won by the player of the machine whose play caused the total to be reached. Although such jackpots can increase player excitement and increased gaming, the randomness of the jackpot or bonus prevents the casino from exercising control over the timing of the win. Because casinos, like most service establishments, experience periods of greater and lesser play depending on patron-driven concerns, such as time of day, day of week, or season of year, casinos could benefit from being able to increase bonus opportunities during off-peak hours.

Embodiments of the invention address these are other deficiencies in known casino gaming systems.

BRIEF DESCRIPTION OF DRAWINGS

Embodiments of the invention will now be described with reference to the accompanying drawings, wherein.

DETAILED DESCRIPTION

Embodiments of the invention include a bonus prize award system including networked gaming machines that allow players of the gaming machines to participate in the bonus prize The bonus prize award system enables casinos to select a winning time and bonus amount, and the ability to increment the winning time and bonus amount to designate a time period within a maximum time period in which a bonus is awarded or the value of the bonus at one or more times during the bonus period is incremented. In so doing, embodiments of the invention allow a casino operator to select a maximum time of the bonus cycle within which the bonus prize will be awarded. In other words, the operator knows the bonus will be awarded before a maximum time period has elapsed.

As used in this description, a pay table of a gaming device is the standard winnings paid or credited to the player by the device itself. A bonus award is machine credits either credited to a machine or credited to a player account by a bonus system, or bonus points credited to a player account by the bonus system. A system award is a benefit that is paid or credited to a player of a gaming device that is not based on either the pay table of the gaming device or a bonus award. Examples of system awards include a complementary meal or show ticket, a drawing ticket, or bonus points or machine credits not based on a gaming device pay table. Together bonus awards and system awards will be referred to herein as incentive awards.

Figure 1:
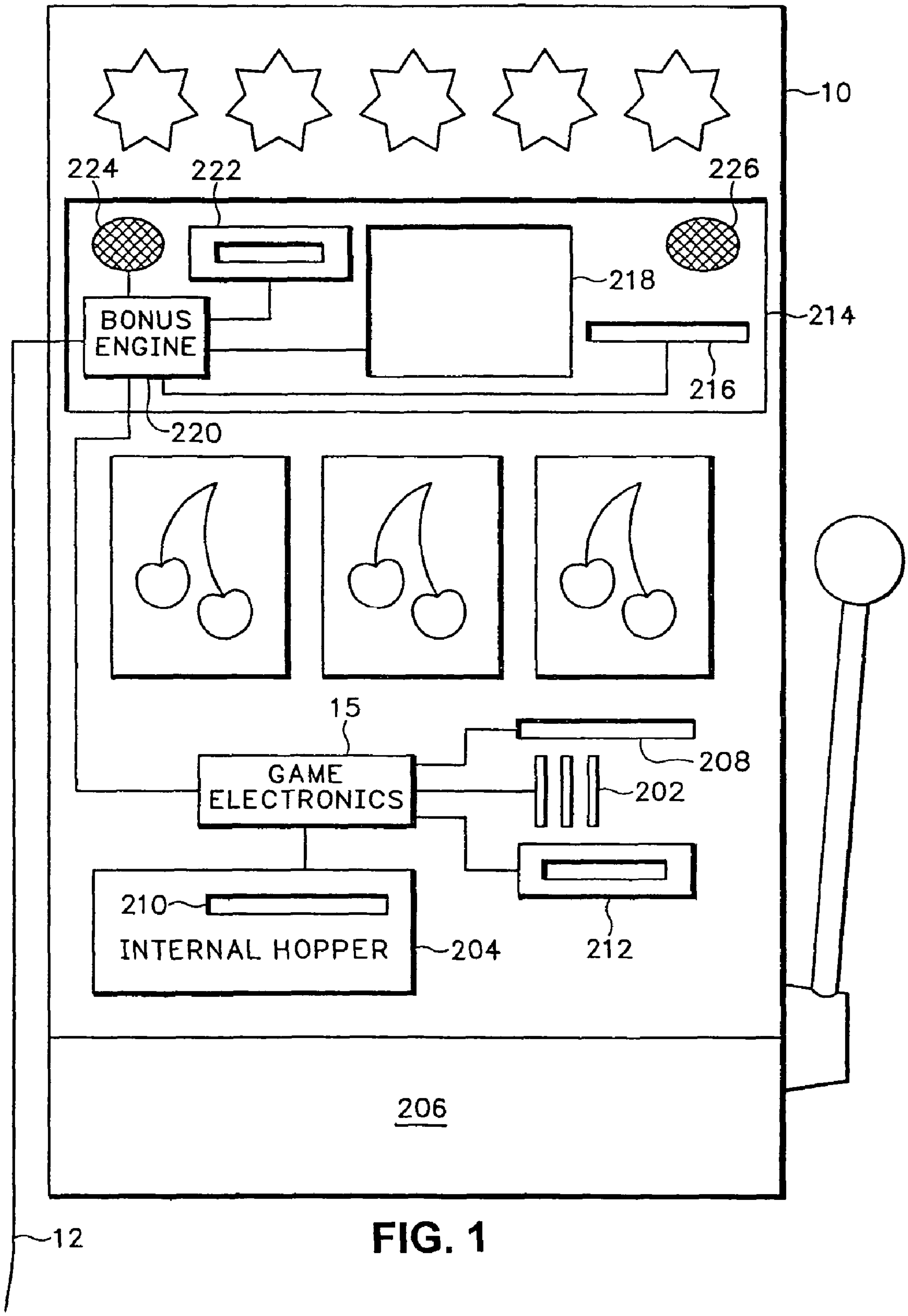
FIG. 1 is a block diagram showing a gaming device used for embodiments of the invention.

Turning to FIG. 1, an electronic gaming device ("EGM") 10 according to an embodiment of the invention is shown. The EGM 10 includes a bill acceptor 208 that accepts and validates bills, tickets or vouchers. Bill validators operate by scanning barcodes or other identifying features on tickets or vouchers, and by examining printing or other security features on paper currency to determine authenticity. Bill validators are well known in the gaming arts.

The EGM 10 also includes one or more coin slots 202 for accepting coins or tokens. An internal hopper 204 temporarily stores coins or tokens for later payment to the player through a payout bin 206, if the player chooses to cash out in such a manner. Bills can also be stored in a separate hopper, and dispensed to the player through the bill acceptor 208 or through another bill slot 210 in the machine cabinet, similar to an ATM machine.

A set of game electronics 15 manages the central operations of the gaming device 10. For example, the game electronics 15 counts the monetary value input into the EGM 10, and tracks and stores values for this and other data items. The game electronics 15 also control the game play of the EGM 10, such as by accepting user input from various buttons (not shown) to cause credits to be wagered, as well as cause motors to spin the game wheels, speakers to generate sound, and circuits to generate lights or video signals. The game electronics 15 may be a main board that interfaces with various controller boards that control specific functions in the EGM 10, or may control the various devices directly.

One of the items controlled by the game electronics 15 is an internal game printer 212. The game printer 212 can be of any type known in the art, such as impact, inkjet, thermal, laser, and can be a color printer or standard black and white. Even if the game printer 212 is only capable of printing in a single color, cardstock or paper used by the printer could be preprinted in color.

The EGM 10 also includes game-mounted components of a player tracking system. The components are generally shown affixed to a frame 214, which is mounted to the gaming device 10. Although components of the tracking system interact with the EGM 10, it is a separate system from the gaming device.

The player tracking system includes a set of electronic inputs and outputs for interfacing with the player. For example, in the gaming device shown in FIG. 1, portions of the player tracking system mounted to the frame 214 include a cardslot with a card reader 216 and a touchscreen display 218. Alternate embodiments could use a traditional keypad, not shown. The display screen 218 may be a Liquid Crystal Display (LCD), a cathode ray tube (CRT), vacuum florescent display (VFD), an LED display, or a plasma display for example. A detailed description of such a touchscreen display

218 is described in U.S. patent publication No. 2003/0109307 published on Jun. 12, 2003, and is incorporated herein by reference for all purposes.

As described in U.S. patent publication No. 2003/0109307 published on Jun. 12, 2003, the bonus engine 220 manages the touchscreen display 218, and card reader 216, as well as provides the bonusing and other functions described above. A player of the gaming device 10 uses a card and/or a PIN code to identify himself or herself to the player tracking system. Monetary value can be entered into the game, either from the ID card itself, from a credit-card account with a bank or from a special gaming account managed by a casino. Alternatively, a player can use the card and/or PIN code to identify himself or herself, and then put credits on the machine by depositing coins, tokens, bills, or tickets/vouchers into the machine.

The card reader 216 and display 218 are managed by functions operating on a "bonus engine" 220, which is a specialized piece of hardware used in the player tracking network. The bonus engine 220 is coupled by a computer connection to the gaming network, and plays a central role in the player tracking system. The bonus engine 220 is in constant communication between the game electronics 15 and the gaming network. The bonus engine 220 receives constant status updates about the state and status of the EGM 10. The game electronics 15 may automatically send information to the bonus engine 220, such as "events", when the events occur, such as at the end of the game, or when a key event happens like a bill being accepted into the EGM 10. Or, the bonus engine 220 may send electronic updates, requests, or polls to the game electronics 15. When polled, the game electronics 15 sends the latest events to the bonus engine 220. Additionally, the gaming network can send commands and directives to a particular EGM 10 through the bonus engine 220 of that device. The bonus engine 220 then performs the commands, such as by displaying a message on the display 218, or the bonus engine delivers the commands to the game electronics 15 of that gaming device.

The EGM 10 further includes a system printer 222 and speakers 224 mounted to the frame 214 of the player tracking system. The system printer 222 and speakers 226 are also coupled to and managed by the bonus engine 220. The system printer 222 works in conjunction with the game printer 212 in that the system printer 222 prints the awards while the game printer 212 prints the traditional game cashout vouchers. The speakers 224 can be made to produce sounds or music by the bonus engine 220. Although the specific hardware included in the gaming device 10 is important in implementing embodiments of the invention, the invention can operate regardless of the type of components in the gaming device 10.

Although a system printer 222 and game printer 212 have been described, other printer configurations are possible and contemplated within the scope of the invention. For example, in another embodiment, a single printer, having two inputs, one from the game electronics 15 and the second from the bonus engine 220 receives, acts upon, and reconciles printing requests from both devices. In a similar embodiment, a single printer with a single input is routed through a device having two inputs, one for the game electronics 15 and the other for the bonus engine 220. In another embodiment, a single printer is coupled directly to the game electronics 15, with the bonus engine 220 coupled to the game electronics and not directly coupled to the printer. In this configuration, print commands originating from the game electronics are transmitted directly from the game electronics 15 to the printer. Print commands originating from the bonus engine are sent from the bonus engine 220 to the game electronics 15 and are then transmitted to the printer. In this way, the game electronics 15 perform a routing and reconciling function for the shared printer. In yet another embodiment, the bonus engine 220 and game electronics 15 reverse functions from the above example, and the bonus engine assumes the routing and reconciliation functions for the shared printer.

Figure 2A:
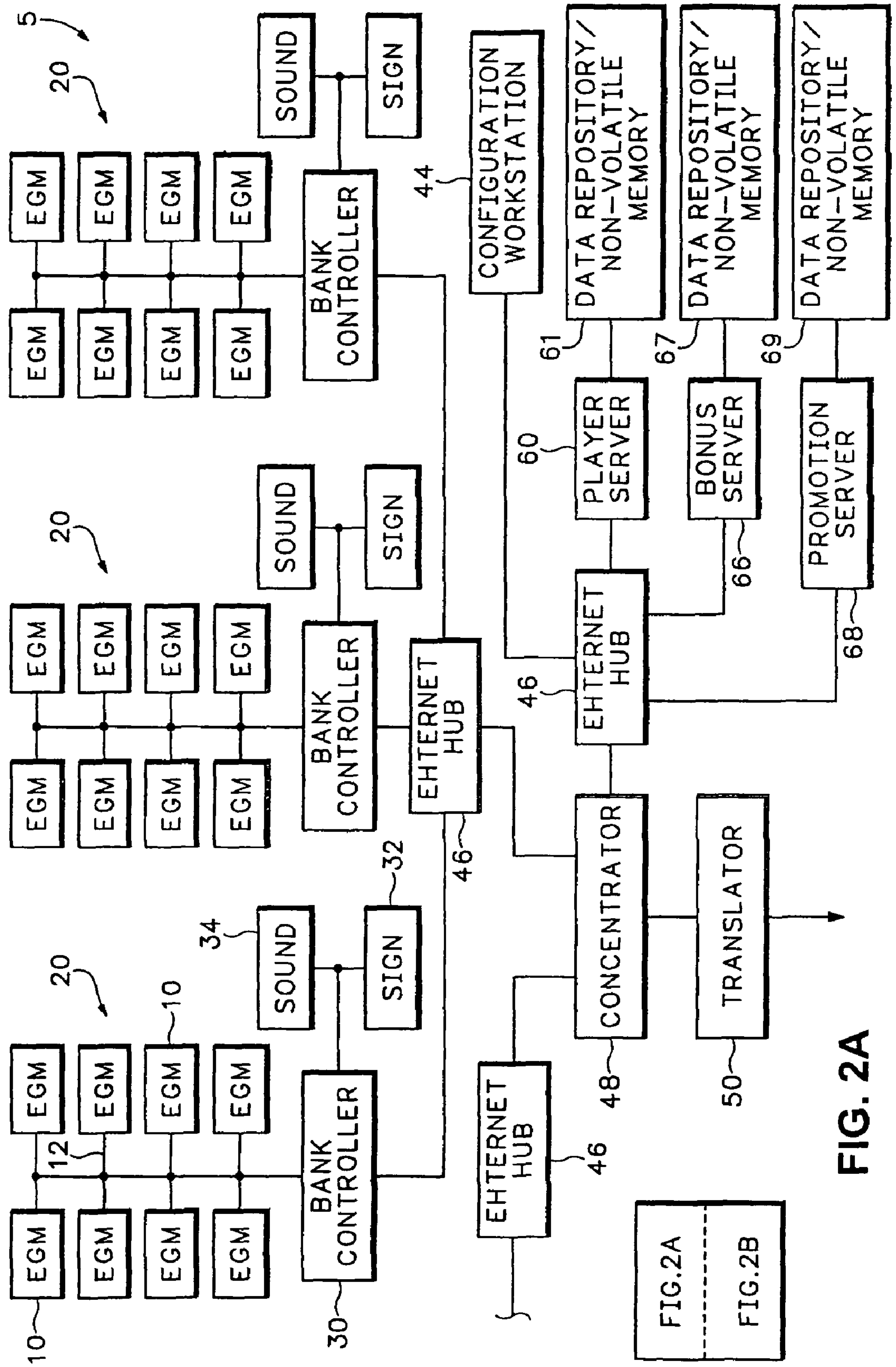
FIGS. 2A and 2B together are a block diagram showing components of a gaming network according to embodiments of the invention.
Figure 2B:
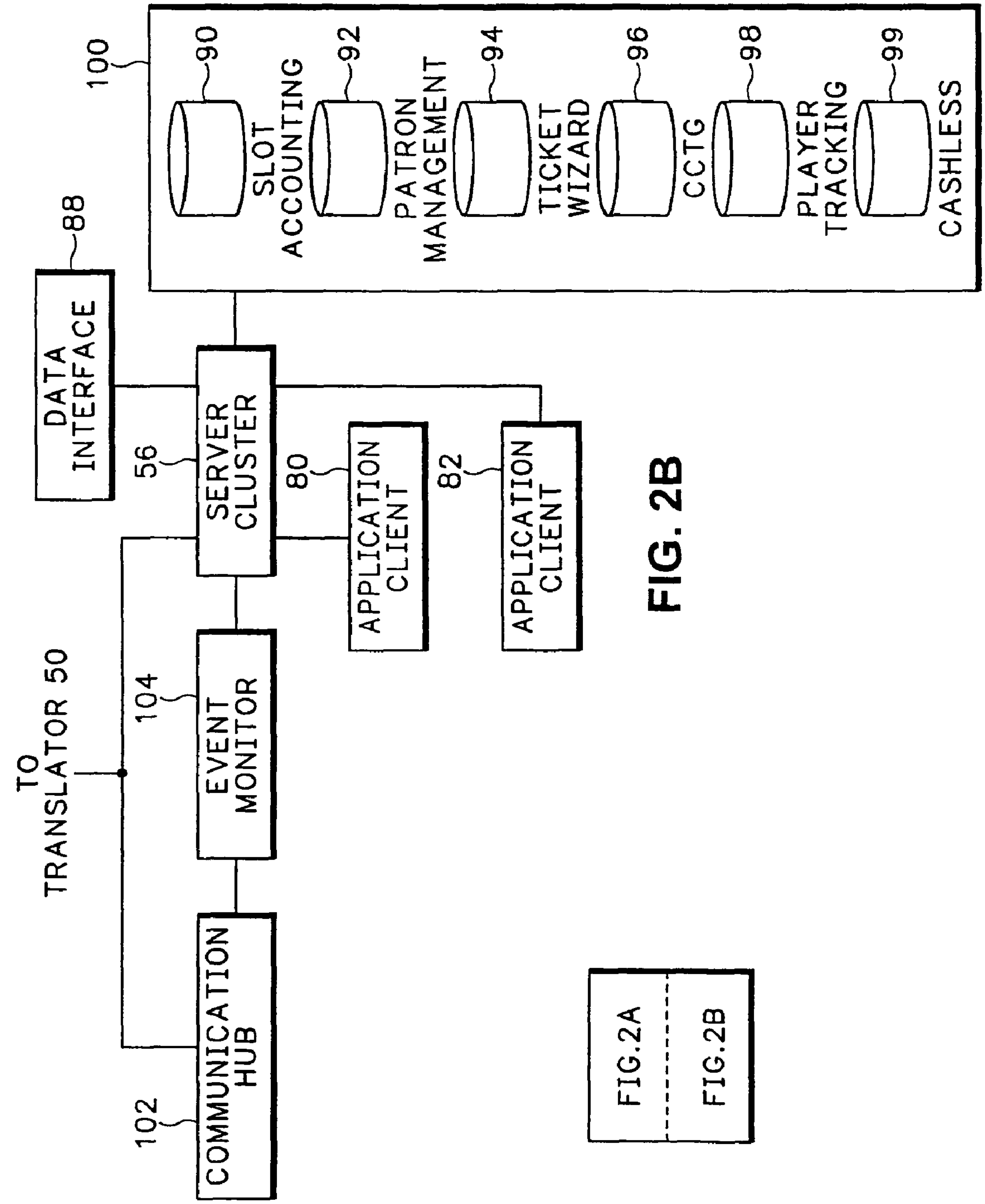

One such gaming network is illustrated in FIGS. 2A and 2B. In a gaming network 5, a number of EGMs 10 are organized in groups called banks. Individual banks 20, 22, and 24, can contain almost any number of EGMs 10. Additionally, any number of banks is possible in a gaming network 5. The gaming network 5 illustrated in FIGS. 2A and 2B is only an example gaming network. Gaming networks can include gaming machines in the same or different establishments, meaning that gaming machines participating in a single bonus can be located in one or more casinos or other establishments. However, fewer than all of the gaming machines in a given gaming network can participate in a given bonus, promotion, or incentive. Those skilled in the art will appreciate that embodiments of the invention can operate on any acceptable network, even if it differs from the one illustrated.

Each bank is controlled by a bank controller 30, which is coupled to each EGM 10 by a communication cable 12. The bank controller 30 facilitates data communication between the EGMs 10 in its associated bank and the other components on the gaming network 5. In some embodiments, the bank controller 30 need not be present, and the EGMs 10 communicate directly with the other portions of the gaming network 5. The bank controller 30 can include audio capabilities, like an audio board or sound card for transmitting digitized sound effects, such as music and the like, to a sound system 34 coupled to the bank controller. Additionally, the bank controller 30 or sound system 34 may include a device for playing locally stored sounds, such as a hard-drive, CD or DVD-ROM drive. The bank controller 30 can also be connected to an electronic sign or screen 32 that displays information, such as scrolling, flashing, or other types of messages that indicate jackpot amounts and the like, which are visible to players of machines on a particular bank. These message displays 32, 34 may be generated or changed responsive to commands issued over the network 5 to the bank controller 30. The sounds and images created by the bank controller may be identical for each of the banks 20, 22, 24, or all of sounds and images created by the banks may be different than the others.

Configuration data for the gaming network 5 is stored in one or more network data repositories 61, 67, 69. In some embodiments, the data repositories 61, 67, 69 are made of battery backed-up non-volatile SRAM (Static Random Access Memory), which provides dual advantages of having extremely fast data input and output, and having a power source that is independent from the network 5 or the EGMs 10. The data repositories 61, 67, 69 may also be mirrored, i.e., duplicate copies are made in real-time. This prevents data from being lost if one of the battery sources should fail or other catastrophic event. Data may be stored in the data repositories 61, 67 69 using CRCs (Cyclic Redundancy Checks) and timestamps to ensure the data is valid and non-corrupt.

Configuration data is created at a configuration workstation 44 and stored in the data repositories 61, 67, 69. Configuration data may include message data for players as well as for promotions such as bonuses. Player message data is stored in the data repository 61, where it can be accessed by a player server 60. Player message data can include welcoming messages, card-in/card-out messages, and special messages about current promotions, for instance. The player server 60 reads the message data from the data repository 61 and sends a properly formatted message back to the bank controllers 30 and EGMs 10. These player messages may be displayed on a screen 32 for an entire bank, or may be shown on a screen directly mounted to the EGM 10 (not shown).

Other configuration data created at the configuration workstation 44 and stored in the data repositories 61, 67, 69 may include casino configuration data, such as identification of each EGM 10 on a casino floor. Additional parameters stored in the data repository 67, 69 are parameters used in promotions, such as bonus promotions. These parameters include such items as what EGMs 10 are included in the promotion, what times a promotion or bonus is in effect, what unit of time a promotion or bonus will be awarded, how to fund a bonus, i.e., if a bonus is funded by a portion of the coin-in amount of the EGMs 10, what the amount of the bonus is, whether the amount of the bonus is to change during a particular bonus period, whether the time for awarding the bonus is to change during a particular period, whether a paid bonus is to be taxed or non-taxed, and other parameters.

As players play the EGMs 10 in the gaming network 5, the EGMs send data from their coin meters, or meter values. One or more bonus server 66 stores these meter values, or summaries of the meter values, in its associated data repository 67.

The bonus servers 66 can also operate based on the present and stored meter values to determine an amount of money being wagered on the EGMs in near real-time. The bonus servers 66 can use the amount of money being wagered to calculate bonus pools that are funded as a percentage of the coin-in of participating EGMs 10. For instance, the bonus servers 66 can calculate a present amount of a bonus pool that is funded at one-half of one percent of the coin-in for the participating EGMs 10. An example of bonus promotions that can be operated from the bonus servers 66 includes LUCKY COIN and progressive bonuses, for example.

The promotion server 68, like the bonus server 66, can use an amount of money being wagered to calculate promotion pools funded as a percentage of the coin-in. Alternatively, the casino or operator can configure the promotion server 68 to award promotions not related to coin-in, for example, bonuses to be awarded at a particular time or bonuses to be awarded at some time during a particular time frame like a maximum time period, and whether the time for awarding the bonus is to change based on coin-in during the bonus period. Likewise the casino or operator can configure the promotion server 68 to award promotions or bonuses that are based on both coin-in and time, or a combination of the two. The promotion server 68 may include functions and processes operative to generate signals to cause a bonus or system award to be generated; generate a time for awarding a bonus, increment a bonus amount or check to see if the winning time for awarding the bonus has been reached; generate a value for the bonus award or a time to increment the bonus award; and to communicate the generated system or bonus award to the particular EGM 10 at which the player receiving the award can receive the award.

In determining when to grant a bonus or system award, the promotion server 68 can access data stored anywhere on the network 5 looking for triggering events, such as: from any of the databases 100 described below; from any of the data repositories 61, 67, 69; from the bank controller 30; and from a bonus engine 220 (FIG. 1) on any or all of the EGMs 10 coupled to the gaming network.

When the promotion server 68 determines that a triggering event has been satisfied and that a system or bonus award should be generated, it sends appropriate signals to the bonus engine 220 of the appropriate EGM 10 through the gaming network 5 to deliver the award. Records of awards and bonuses may be maintained by the promotion server 68 or elsewhere in the gaming network 5 for tracking and accounting purposes.

Of course, the servers 60, 66, 68 could be embodied in a single device, or in other configurations, and do not have to appear as in FIG. 2A, which is only a functional representation. Likewise, the data repositories 61, 67, 69 could be embodied in a single device.

As data is generated by the EGMs 10, data is passed through communication hardware, such as Ethernet hubs 46, and a concentrator 48. Of course, switches or bridges could also be used. The concentrator 48 is also coupled to a translator 50, which includes a compatibility buffer so that the data from the EGMs 10 can be used by a server cluster 56 (FIG. 2B), and other parts of the gaming network 5. A communication hub 102, in turn, is connected to the translator 50 and to an event monitor 104. The event monitor 104 is also coupled to a server cluster 56 (FIG. 2B). The server cluster 56 may, of course, be embodied by more than one physical server box. In practice, including multiple server boxes with dynamic load sharing and backup capabilities of one another ensures the gaming network 5 is nearly always operational.

The server cluster 56 is attached to and manages several databases, such as a slot accounting database 90, a patron management database 92, a ticket wizard database 94, a "Cage Credit and Table Games" (CCTG) database 96, a player tracking database 98, and a cashless database 99. These databases are collectively referred to as the databases 100. Of course these databases 100 are only exemplary, and more or fewer databases can be part of the gaming network 5. In some embodiments, particular servers in the server cluster 56 manage a single database. For example, a single server in the server cluster 56 may manage the slot accounting database 90, while another server manages the patron management database 92. Such implementation details are well within the expertise of one skilled in the art. However, for ease of illustration, FIG. 2B shows a single server cluster 56 that is coupled to all of the databases 100.

In operation, the slot accounting database 90 receives and stores statistical and financial information about the EGMs, such as dates, times, totals, game outcomes, etc. The patron management database 92 stores information regarding identified players, such as how often and which games they play, how often they stay in the casino, their total loyalty points, past awards, preferences, etc. The ticket wizard database 94 stores data about tickets that are issued by the EGMs, such as payouts and cashout tickets, as well as promotional tickets.

The CCTG database 96 stores information about non-EGM 10 data in a casino. That data is typically generated by a client station (not shown) coupled to one of the bank controllers 30. The client station can be located in a casino cage or at a table game, for instance, and data generated by the client station is forwarded to the CCTG database 96 where it is stored. For example, data such as when and how many chips a customer buys, when a customer creates or pays off markers, when a customer cashes checks, etc. is stored in the CCTG database 96.

The player tracking database 98 is a subset database of the patron management database 92, and is used when data retrieval speed is important, such as for real time promotions and bonusing. The cashless database 99 stores information about payment options other than bills, coins, and tokens.

Application clients 80 and 82 couple to the server cluster 56, and can retrieve data from any or all of the databases 100. Application programs run on an application client 80, 82 to provide users information about the gaming network 5 and the casino in which the network is established and to cause functions to operate on the gaming network 5. An example application client 80 could include, for instance, an accounting server that allows queries and provides reports on financial and statistical information on single or groups of EGMs 10.

A data interface 88 presents a uniform interface to other applications and servers (not shown), and grants access to retrieve data from the databases 100. Typically these other clients or servers would not be controlled by the same entity that provides the other components of the gaming network 5, and therefore the data interface 88 grants only guarded access to the databases 100.

Details of how the system in FIGS. 2A and 2B identifies, generates, and awards bonuses based on a winning time during timed bonus cycles are shown in FIGS. 3A-3C and 4. FIGS. 3A-3C and 4 are example flow diagrams illustrating processes that can be used by the system. For brevity, functions relating to messaging and bonus awards will be referred to as occurring on the promotion server 68, although they could be performed on either the promotion server, bonus server 66, bonus engine 220, or elsewhere in the gaming network. Collectively, the promotion server 68, bonus server 66, and bonus engine 220 are also referred to as a bonus controller.

Figure 3A:
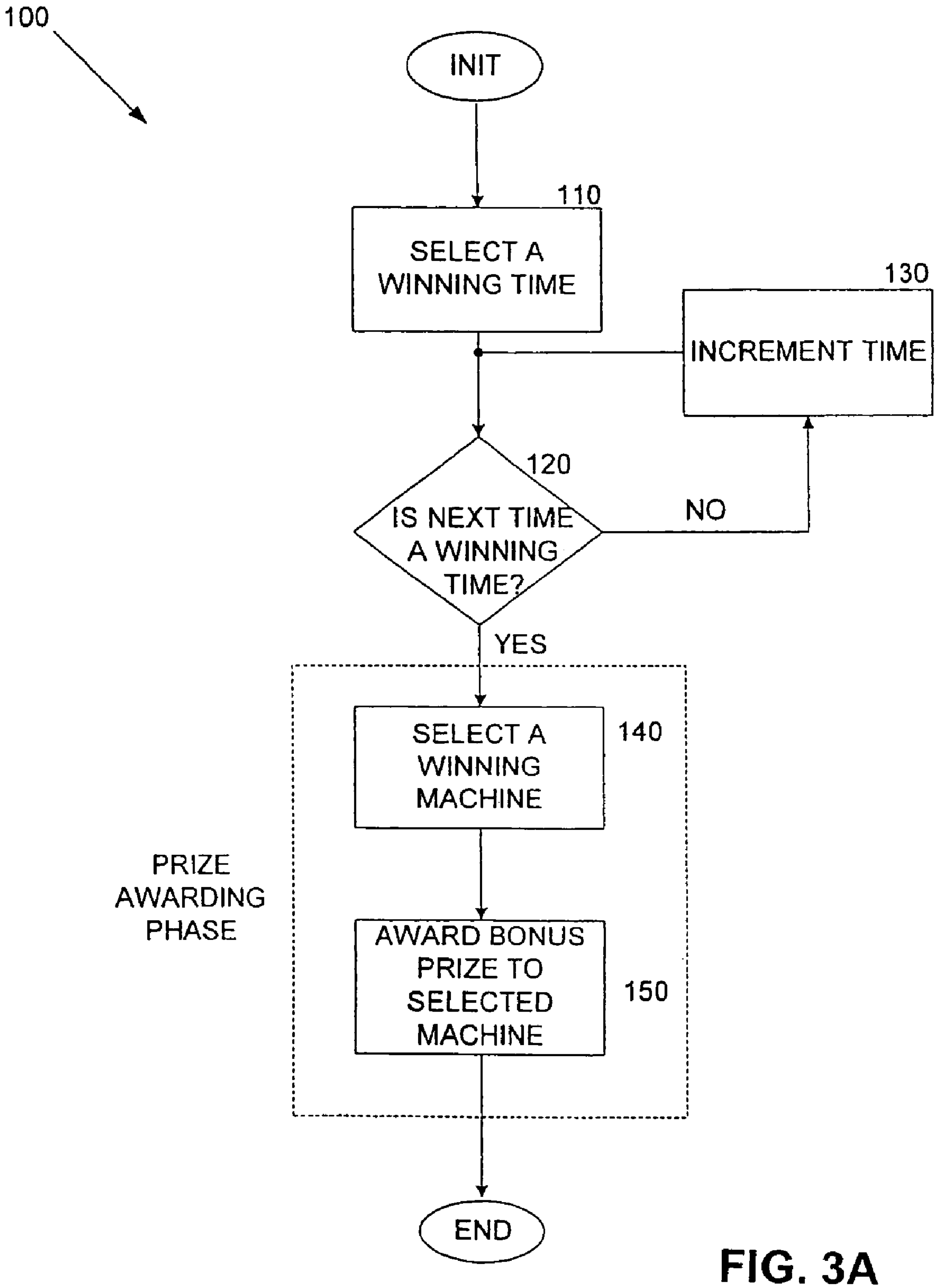
FIGS. 3A-3C are example flow diagrams showing bonus cycles according to embodiments of the invention that can be performed by the network of FIGS. 2A and 2B.

FIG. 3A is an example flow diagram of a basic bonus cycle or period according to an embodiment of the invention. Referring to FIG. 3A, upon initialization of a bonus cycle, a maximum time is determined. The bonus controller divides the maximum time into equal time increments, or ticks, and randomly selects a winning tick from the population of all possible ticks or time increments. These time increments or ticks may be fractions of a second or several hours depending on the unit of time selected, and the length of the bonus cycle. For instance, a bonus cycle may last 3 hours, and the process 110 could determine that the winning time will be at 88 minutes from the start of the bonus cycle. Some operators may set the maximum length of a tick at less than the play time of a single game play on a gaming device.

The winning time or tick can be selected at random or can be selected from a weighted table, thereby allowing an operator to skew the relative likelihood of the winning time being in a certain section of the bonus cycle, such as near the end of the bonus cycle to build player anticipation. For example, the range of all possible ticks can be divided in an operator selectable number of "bins" with each bin containing an equal number of ticks. Assume, for example 32 bins. Each bin can be hard coded with its own pay table and each can have its own relative weight. Differences between the relative weights between bins can be any amount, including a factor of 100, 500, or 1000. Using a random number generator (such as the KISS Random Number Generator) between 1 and the total number of bins, in this example 32, the bonus controller selects a random number representing one of the bins. In a like manner, the bonus controller selects a random tick from within the randomly selected bin. The selected tick is the winning tick.

Thus, one method to select a winning time of a bonus cycle can include selecting a maximum time for the bonus cycle, dividing the maximum time into time increments, or ticks, weighting the time increments, and selecting a winning time increment at random from the weighted increments. The winning tick is stored in memory and is kept secret from the operator and the players of the eligible gaming machines, those gaming machines associated with the bonus pool from which the bonus is to be awarded. After storing the winning tick, the bonus controller initiates a bonus cycle.

Turning back to FIG. 3A, a winning time increment, or tick, is selected in a process 110. The winning tick must be less than or equal to the maximum time of the bonus cycle. As an example, let the maximum time of the bonus cycle be forty-eight hours. Furthermore, let the time increments or ticks be one minute increments. Therefore, in this example, process 110 (FIG. 3A) would choose a random number between one and two thousand eight hundred eighty (2880) (the number of minutes in forty-eight hours). In this example, assume the process 110 randomly selects eight hundred four (804). This means that, in this example, the bonus prize will be awarded on the eight-hundred-fourth minute of the bonus cycle, the winning time.

After selecting the winning time, the flow 100 proceeds into the actual bonus cycle and determines if the current time is the winning time in a determination process 120. When the current time is not the winning time (in this example, less than eight hundred four minutes have passed), the flow 100 waits for the next time period (in this example, one minute) and then increments the current time to the next time increment in a process 130. Thus the flow 100 will wait one minute in this example, since the winning times are divided on discrete minute intervals. After waiting for this interval and incrementing the correct time, the flow 100 again enters the determination 120 to check if the new current time is the winning time. If the current time is still not the winning time, the cycle repeats until the winning time is reached.

In the present example, when the process 120 determines that the current time is the winning time (in this example, eight hundred four minutes have passed since the beginning of the cycle), the winning time has been met and the flow 100 continues to a prize awarding phase. Thus, reaching the winning time is the triggering condition for the award of a bonus.

The bonus prize value is not necessarily awarded as a matter of course to the player of the gaming machine that last played a linked machine after the winning time was reached, although it can be. In other embodiments, rather, a winning machine is selected in a process 140 from the group of eligible machines, eligibility being determined by the operator, the individual games, or the network, either randomly or responsive to operator commands.

Examples of such a process include identifying certain "triggers" for the award of the prize. A "trigger" is one or more pre-set conditions that, when satisfied, result in an action, in this case the award of a bonus to a specific one or more of the eligible machines or players. In determining which machine or player is to be awarded the prize, the operator or network makes a selection based on one or more triggers. Examples of such triggers are set forth in Table 1.

TABLE 1

| Machine Outcome | Player Behavior | Random Triggers |
|---|---|---|
| Specific Game Outcomes | Points Earned | Lucky Coin |
| Series of Game Outcomes | Win/Loss Per Unit of Time | Lucky Time |
| Sets of Game Outcomes | Handle Per Unit of Time | Lucky Game |
| Consecutive Game Outcomes | Continuous Play | |
| X outcomes in N tries | | |
| Outcome sets/unit time | | |
| Outcomes relative to others | | |

Trigger Definitions:

A “Specific Game Outcomes” triggering event occurs when the player obtains a predefined result on a game on the gaming device. Examples include, for instance, a “four-of-a-kind” (or a particular four, such as four aces) in a poker game, “seven-seven-seven” in a slot game, or obtaining a particular bonus symbol on one of the reels. An award can be generated when any particular predefined outcome of the game is met, for instance during the period of the bonus cycle.

A “Series of Game Outcomes” triggering event occurs when the player obtains certain results during multiple plays on the gaming machine or series of gaming machines in a predetermined order. One example is where a player obtains, on a video poker machine, a pair, two pairs, three-of-a kind, straight, and flush, in that order but not necessarily consecutively. An award can be generated when any predefined series of results is met, for instance during the period of the bonus cycle.

A “Sets of Game Outcomes” triggering event occurs when the player obtains certain results during multiple plays one or more gaming machines regardless of order. Examples include a player receiving his/her fourth four-of-a-kind on a video poker machine, or a player obtaining jackpot payouts on each of the possible paylines in a slot-based game. An award can be generated when the last in the predefined set of results is met, for instance during the period of the bonus cycle.

A “Consecutive Game Outcomes” triggering event occurs when the player obtains certain consecutive results during multiple plays on one or more gaming machines. Examples include a player winning on five consecutive hands or receiving two consecutive hands containing a minimum level of win (such as three-of-a-kind) on a video poker machine, or where a player receives a particular bonus symbol on the payline of a slot machine three consecutive times. An award can be generated when the last of the predefined consecutive game outcomes is met, for instance a player receiving particular outcomes during the period of the bonus cycle.

An “X Outcomes in N Tries” triggering event occurs when the player obtains certain results during multiple plays on one or more gaming machines within a certain number of tries. Examples include a player obtaining both a straight and a flush within five games of one another, but not necessarily consecutively or in that order, or where a player obtains seven-seven-seven during the first 50 plays of a particular slot machine. An award can be generated when the “xth” outcome is reached by the player, for instance during the period of the bonus cycle.

An “Outcome Sets/Unit Time” triggering event occurs when a player obtains certain results during multiple plays on one or more gaming machines primary game within a set period of time, for example during the period of the bonus cycle. Examples include a player obtaining 10 jackpot awards on a slot machine within a ten minute period, a player obtaining three flushes within a one-hour period on a video poker machine, or the player having the most awards at the winning time.

An “Outcomes Relative to Others” triggering event occurs when a player obtains a certain result or results on one or more gaming devices before (or after) other players at a specified group of games, for example during the period of the bonus cycle. Examples include the player with the highest or lowest rank or rating of all uncarded or unenrolled players at the winning time.

A “Points Earned” triggering event occurs when a player earns a certain number of points on one or more gaming devices, such as: bonus points, Xtra credit points, or even machine credits. An award can be generated for example to the player with the most points at the winning tick.

A “Win/Loss Per Unit of Time” triggering event occurs when a player obtains a certain number of wins or loses on one or more gaming devices over a predetermined time period, for instance during the period of the bonus cycle. Examples include a player losing 100 times over a 20 minute time period, where a player wins 7 times over a one-minute period, or the player having the most wins/losses at the winning time.

A “Handle Per Unit of Time” triggering event occurs for players betting a certain amount over a certain time period on one or more machines, for instance during the period of the bonus cycle. Examples include a player betting at least a total of $500 at a slot machine over a one-hour period, where a player bets his/her $1000^{th}$ coin at a nickel poker machine, or the player with the largest handle during the bonus cycle.

A “Continuous Play” triggering event occurs after the player has continuously played on a machine, or series of machines, for a preset time period, for instance during the period of the bonus cycle. For example, the award might be triggered to the player with the most continuous play at the time of the winning tick.

A “Lucky Coin” triggering event occurs for a player inserting the xth coin-in on a certain pre-designated portion of the games coupled to the gaming network 5, for example during the bonus cycle. An award can be generated when the coin is inserted or credit otherwise transferred. For instance, the player inserting the xth coin at the winning time.

A “Lucky Time” triggering event occurs for a random player playing at a designated time of day, for example a random player from among the players playing during the winning time increment.

A “Lucky Game” triggering event occurs for a random player who is playing on one or more of the gaming devices coupled to the gaming network 5, for example a player who is playing during the bonus cycle.

These are only a small sample of potential triggering events that can be contemplated and the invention should not be so limited to those disclosed and described. Embodiments of the invention could conceivably use any data accessible anywhere in the gaming network 5 to create a trigger.

Triggering events need not be applied uniformly to all of the gaming devices coupled to the gaming network 5, or to all of the players playing the gaming devices. There may be different triggering events or sets of triggering events for different groups of gaming devices. For example, with reference to FIGS. 2A and 2B, a first set of triggering events could apply to the EGMs 10 that are in bank 20, but not to those EGMs in banks 22 and 24. That is, there could be a triggering event implemented, such as generating a drawing ticket after “x” minutes of play, where “x” is 40 minutes for EGMs in bank 20, 50 minutes for EGMs in bank 22 and 60 minutes for EGMs in bank 24. Of course, although illustrated here as groups of EGMs associated with a particular bank, any of the EGMs 10 within the entire network 5 could have one or more triggering events that are different from any other EGM.

The same level of control extends to player groupings as well. For instance, certain triggering events could be set up for those players who have signed up for player tracking in the past 6 months, while another set of triggers applies to other players. Individual tailoring of a gaming network based on player identity is disclosed in copending application entitled “Player Specific Game System,” U.S. patent publication No. 2003/0078101 A1 published on Apr. 24, 2003, which is assigned to the assignee of the present invention and incorporated herein by reference for all purposes. One way to tailor the gaming network is to have different triggers for groups of players, or for individual players themselves.

Figure 3B:
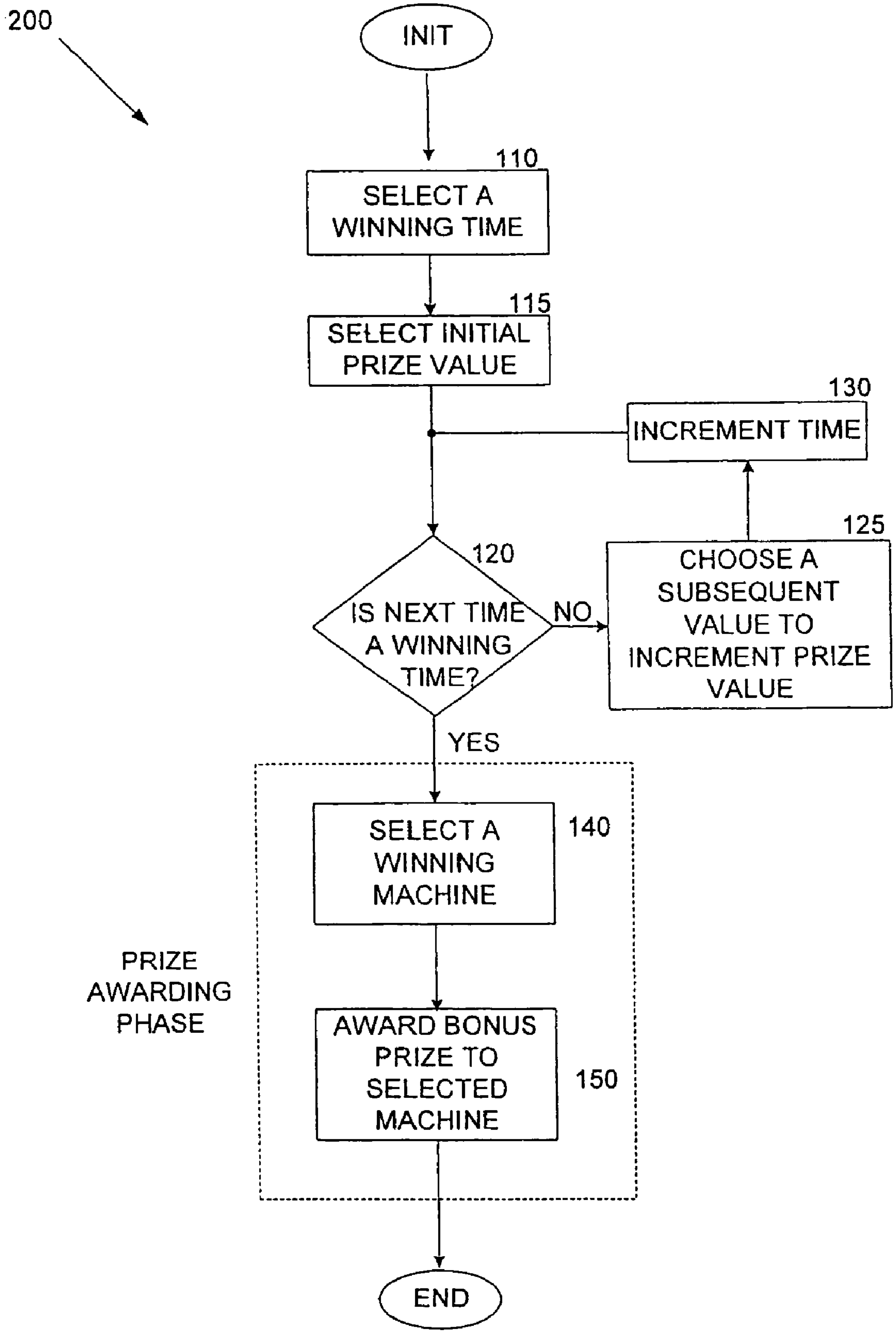
Figure 3C:
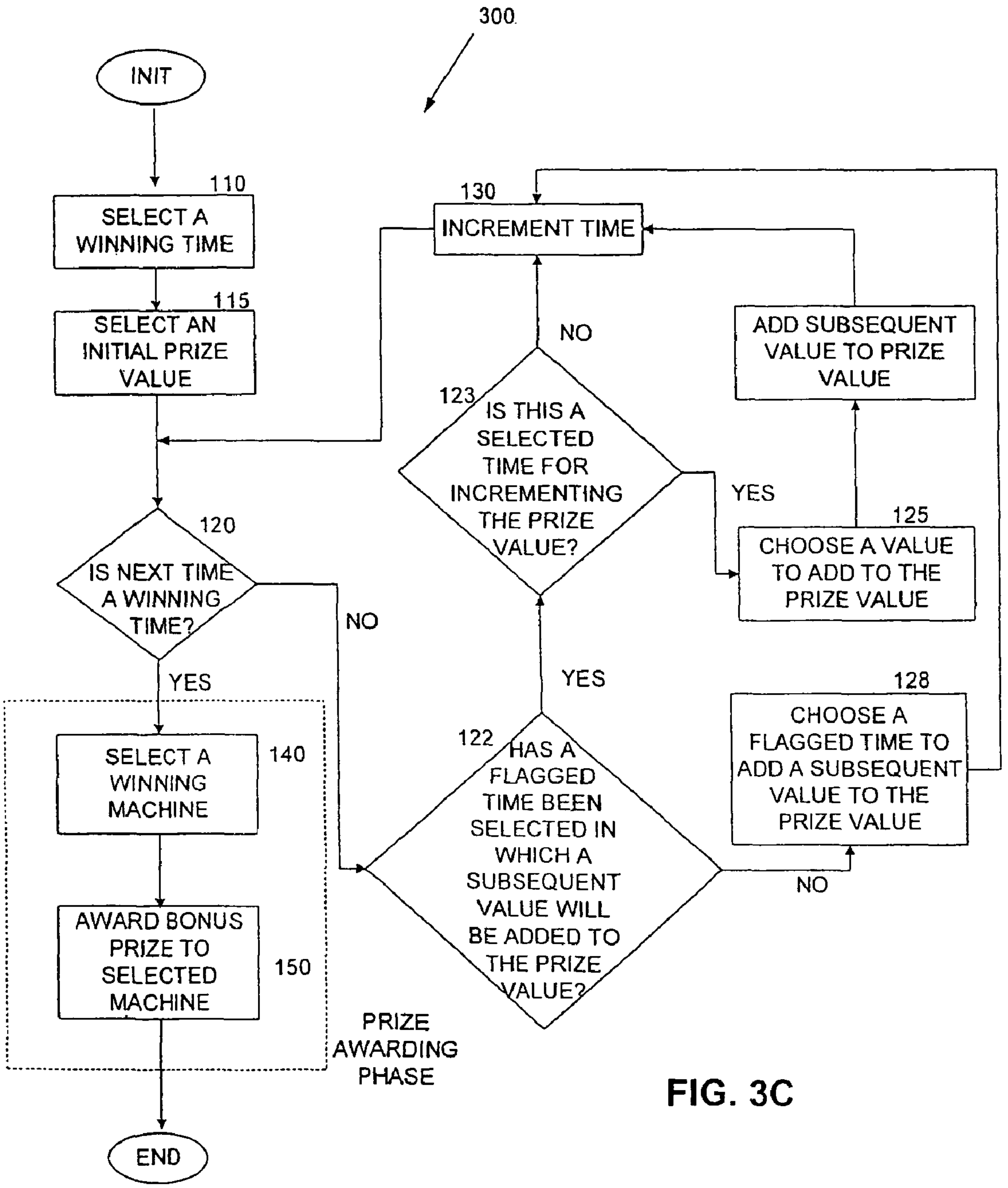
Figure 4:
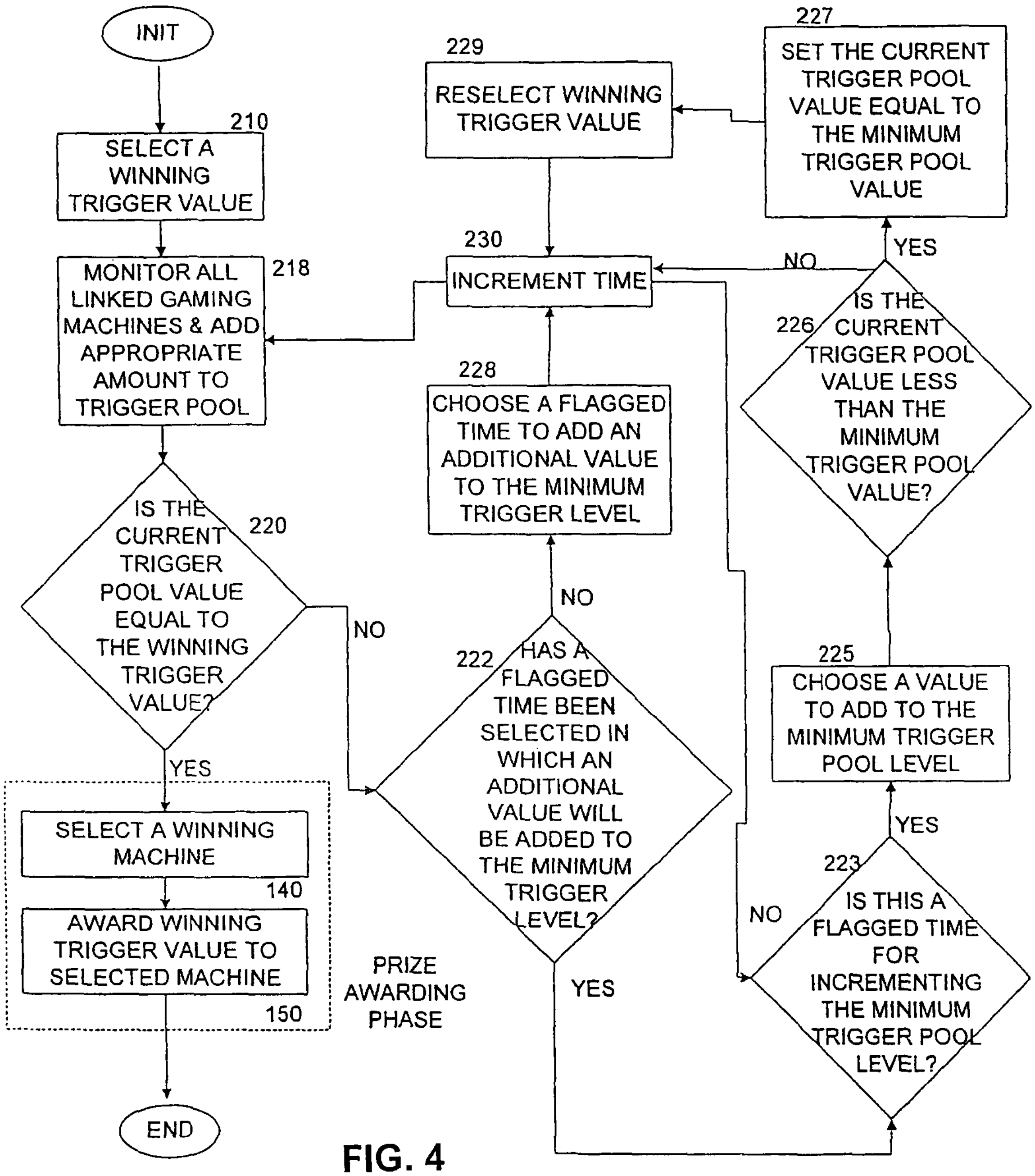
FIG. 4 is an example flow diagram illustrating a bonus cycle according to another embodiment of the present invention.

The triggers described above with respect to FIG. 3A can be used to select the winning machine for the processes described in FIGS. 3B, 3C, and 4.

Once again, it is reaching the winning time or tick that causes the trigger to award the prize to the one or more eligible machines or players participating in the bonus. During the prize awarding phase, a visual and/or audible indication of the bonus prize value being awarded may be given via the machine's display, such as a touchscreen display 218 (see FIG. 1), for example, or through another device associated with a machine or bank of machines 32, 34 (see FIG. 2A), such as by flashing lights, illuminated signs, or bells, for example. Once the winner of the bonus prize is determined, the bonus prize is awarded to the winner in a process 150. This completes a single bonus cycle.

If the bonus controller was off or communication problems within the system prevented the triggering condition and no winning time was selected, the bonus controller selects a new winning tick between the present time and the end of the bonus period. If the current time is after the end of the bonus cycle, the bonus controller send a payment fail message to all the hosts and begins again during the next bonus cycle.

Another example flow diagram illustrating other embodiments of the invention is presented in FIG. 3B. This flow allows an initial prize or award value to be selected at the initialization of a bonus cycle and subsequent values to be added to the initial value to increase the prize value during the bonus cycle. In some embodiments, the prize value can be increased as more time elapses in the bonus cycle, which increases player excitement and anticipation. The amount of increases in the prize value during the bonus cycle can be communicated to players via displays at the gaming machines 218 (see FIG. 1) or displays or speakers associated with multiple machines 32, 34 (see FIG. 2A), such as an overhead sign or speaker above a bank of machines 20 (see FIG. 2A). Alternatively, players can be informed of the possibility of increases being made, without being informed about the specific amount of the increase.

Referring to FIG. 3B, the bonus is initialized by selecting a winning time in the process 110, as was described with respect to FIG. 3A. Additionally, an initial prize value is selected in a process 115. This initial prize value may be selected at random from a range of values, selected randomly from a weighted table or values, or set by an operator, for example. For example, let the initial prize range be $250-$1000 and assume that the process 115 selected an initial prize value of $500 Also assume that the process 110 selected a winning time of the eight-hundred-fourth-minute (804) in the bonus cycle.

After the initialization procedure, the bonus cycle starts and a determination process 120 ascertains if the current time is the winning time. When the winning time has not yet been reached, the processor can add a subsequent value to the current prize value in a process 125 if the elapsed time equals a time for adjusting the prize value to create an incremented or subsequent prize value. This subsequent value can be, e.g., chosen at random from a range of values, chosen at random from a weighted table of values, or fixed by an operator. Again for example, let the subsequent value be randomly chosen to be $1.00 per minute, which is the same time increment used in determining the winning time. The subsequent value could be set to zero if the operator did not want to increase the prize value from its initial value.

After the prize value has been incremented, the flow 200 resets the elapsed time before the next adjustment and waits for the time to increment to a next possible winning time in the process 130. In some embodiments, the incremental value chosen in the process 125 will be the same each time the flow 200 reaches the process 125. In other embodiments, a new value, if any, is chosen each time, or at other intervals. Adjustments and incrementing continue to occur until the end of the adjustment period which could be when the prize is awarded and the initial prize value is reset or until the bonus cycle ends. Any changes to the adjustment amount during the bonus cycle can take effect at the end of the current adjustment period.

When the process 120 determines that the current time is the winning time the triggering condition is met and the flow 200 proceeds to the prize awarding phase, which as described above, awards the current bonus prize to one of the eligible machines or the eligible player via the machine. In the above example, the prize value to be awarded, assuming a $1.00 increment per minute is $1304 ($500+($1.00×804 minutes)). The amount of the bonus paid to the winner is equal to the current prize value at the time of the winning time increment or tick.

A further embodiment includes enhancements to the bonus sequence described above, as shown in flow 300 of FIG. 3C. Enhancements relating to the timing of choosing a subsequent value to add to the current prize value are shown. Since in the above embodiments the subsequent values are added at variable time increments, the flow 300 further allows the bonus prize to be incremented in other time increments that may occur more often than the time period increments for winning the bonus. This, in turn, can lead to a more exciting bonus for players because the subsequent value added to the current bonus prize can be relatively large. For the purpose of explanation the range of time increments are fifteen to forty five minutes and the subsequent value range can be $5-$150, although other times and values are possible.

Referring to FIG. 3C, flow 300 differs from flows 100 and 200 in that, if the process 120 determines that current time is not the winning time 120, the flow 300 next determines in a process 122 if a flagged time for adding a subsequent value has been reached. When a flagged time has not been selected, the flow 300 can randomly choose a flagged time from a range of time increments, from a weighted table of time increments in a process 128. Again for example, let the processor randomly choose the next time increment to be thirty minutes with a subsequent value of $100. In addition, just as it is possible for the operator to select the amount of the subsequent value added, it is also possible for the operator to select the time or time interval for adding this subsequent value. This means that the operator may have complete control of the entire prize value by selecting the initial value as well as selecting when and how much to add to the current prize values as subsequent values. This may be advantageous to an operator if it is desired to control the prize value in relation to other factors, such as, for example, how much the games are being played.

After the flagged time has been selected in a process 128 the chosen time is incremented at a process 130. If the current time is a winning time at a process 120, the triggering condition has been met and a prize is awarded. If the current time is not a winning time the flow returns to process 122.

Referring back to FIG. 3C, when a time for adding a subsequent value has been selected, the flow then exits process 122 and checks the current time to see if it is a presently flagged time to add a subsequent value to the current prize value, in the process 123. When the current time is not a flagged time, then the flow 300 simply waits for the time to increment to a next possible winning time 130. However, when the current time is a flagged time, the flow 300 exits the process 123 in the "yes" direction, and a subsequent value is added to the current prize value in a process 125. This subsequent value can be determined by an operator, randomly selected from a range of values, or randomly selected from a weighted table of values, for instance. After the subsequent value has been added to the current value in the process 127, the flow 300 waits for the time to increment to a next possible winning time 130. If the next time is not the winning time, the flow 300 can use the same time interval and subsequent value from before (selected in the processes 122 and 127, respectively), or select a new interval and/or subsequent value. The flow 300 continues until the winning time is reached in the process 120, at which point the flow 300 enters into the prize awarding phase, as described above.

Alternatively, or additionally, the subsequent value that is added in the process 127 may be added to the current prize value at the end of the time increment, rather than during particular incremental times. Or, an "odometer" flag can be set so that the subsequent value "rolls up" over the time increment. Thus, if the odometer flag was set in the above example, the $100 could be added to the current prize value over the thirty minutes at a rate of, for example, 2.777778 cents per half second.

Still another embodiment of the current invention is illustrated in an example flow diagram in FIG. 4. In FIG. 4, a flow 400 combines both a time limiting element for the bonus cycle along with a method to increase the speed of the awarding of the prize value when the gaming machines are getting a substantial amount of play. An advantage of this embodiment is that it can allow a gaming machine operator to have the prize value awarded in a set amount of time, but also reward players with faster paying bonuses if the machines are being played at a fast rate, or if the machines are receiving large bets.

This embodiment is accomplished by having the bonus triggered by a predetermined winning value in a trigger pool, while also having a separate time based monitor to ensure that the prize value is awarded within the maximum time allotted to the bonus cycle. The time based monitor can take the form of a separate award pool which functions as a minimum pool level.

Referring to FIG. 4, upon initialization of the bonus cycle, the winning trigger value of the bonus cycle is selected in a process 210. This winning trigger value can be selected by an operator, randomly chosen from a range of values, or randomly chosen from a weighted table of values, for instance. For purposes of explanation, let $500 be chosen as the winning trigger value from a range of $1-$1000.

Next, some or each play of any of the participating gaming machines (1-5 of FIG. 1) is accumulated in a process 218 as a trigger pool. These counts can occur based on number of plays of the game and/or units wagered on the gaming machines. Again for explanation purposes, let the trigger pool equal 0.2% of the coin-in on the linked gaming machines. After an event has been added to the trigger pool, a process 220 determines if the present level of the trigger pool level is at or above the winning trigger value selected in the process 210. When the current level in the trigger pool is greater than or equal to the winning trigger value in the process 220, then the flow 400 enters the prize awarding phase, as described above.

However, when the current trigger pool level is less than the winning trigger value in the process 220, the flow 400 next checks to see if a flagged time for increasing the minimum trigger level has been selected in a process 222. When the flagged time has not already been selected, a flagged time may then be selected in a process 228 so that the minimum trigger value can be subsequently increased. This flagged time can be selected by an operator, randomly chosen from a range of incremental time values, or randomly chosen from a weighted table of incremental time values, for instance. For example, assume the flagged time is randomly selected to be ten minutes in the process 228. Then, the flow 400 waits in the process 230 for the time to increment to another possible flagged time while the process 218 continues to monitor input events from the gaming machines.

When a flagged time has been selected, however, the flow 400 exits the process 222 in the "yes" direction and checks to see if the current time is equal to the flagged time in a process 223. When the current time is not equal to the flagged time, the flow 400 again proceeds to the process 230, where it waits for the time to increment to a next possible flagged time.

When the current time equals the flagged time in the process 223, a process 225 selects a value to add to the minimum level of the trigger pool. This value can be selected by an operator, randomly chosen from a range of values, or randomly chosen from a weighted table of values, for example. For instance, assume the process 225 randomly chooses the value to be $5.

Next, in a process 226, a minimum level of the trigger pool is compared to the current level of the trigger pool. When the minimum level is less than or equal to the current level, the flow merely loops back to the process 230, and waits for the time to increment. In this example, the 0.2% of coin in has given a larger value than $5.

When the minimum level of the trigger pool is greater than the current level, as determined in the process 226, the current level of the trigger pool is set equal to the minimum pool level. So, in the described example, the trigger pool level would be set at $5 and additional coin-in would be added to this current value. Additionally, the winning trigger value may be reselected in a process 229 so that the increase in the current trigger pool value does not bypass the winning trigger value. This reselection of the winning trigger value can be to a value between the current trigger pool value and a maximum trigger pool value, and can be selected by an operator, or randomly chosen, for example. In the current example, the current trigger pool level is set to $5 and then the winning value is reselected from values between $5.01-$1000. The flow 400 then waits for the time to increment in the process 230. Of course, the flow 400 continues to monitor the input events on the gaming system in the process 218.

By using this embodiment of the invention, the operator has near complete control in setting the minimum award ultimately paid to the winning player. Additionally, minimum values can be set that ensure that the ultimate award is at or above a certain value, which can enhance the gaming experience.

Using the system described with reference to FIGS. 2A and 2B and further described above in FIGS. 3A-3C and 4, casinos can award bonuses during predetermined maximum periods based on winning increments of time within the predetermined maximum periods, can adjust the time increments in which bonus are awarded, and can adjust the prize amounts during a bonus based on the level of play during the bonus cycle.

By allowing the operator greater control over the times during which bonuses are awarded, casinos can increase player excitement during historical off-peak hours and in doing so can maximize play on machines during those off-peak hours. By advertising such bonus awards in advance, casinos can ensure that a greater number of players will be present in the casino during such historical off-peak hours.

The result is that casinos can direct their marketing efforts to the times of day or days of year most beneficial to the casino.

Although embodiments of the present invention have been described in detail for clarity herein, it should be realized that there are many ways to change or make additions to these descriptions by one skilled in the art while staying within the scope and spirit of the present invention. Additionally, all specific values described in these embodiments have been provided as example values for clarity, and are not necessarily values that must be incorporated into the embodiments. Rather, the values may be selected in any range by the machine manufactures, the machine programmers, or the machine operators, for example. Additionally, when one event or process is described as being before or after another event or process, it should be realized that a different ordering of events or processes is contemplated and within the scope and spirit of the present invention. Therefore, the present invention should not be limited by these embodiments and rather by only by the following claims.

What is claimed is:

1. In a gaming network coupled to a plurality of gaming devices, and to a bonus server, a method of awarding a bonus prize comprising:

receiving, by the bonus server, a maximum time for a bonus period as input by an operator;

dividing, by the bonus server, the maximum time into a plurality of equal time increments;

dividing, by the bonus server, the range of all possible time increments into an operator selectable number of bins, each bin containing an equal number of time increments, each bin including an associated pay table and an associated relative weight;

randomly selecting using the associated relative weight, by the bonus server, a winning bin of the operator selectable number of bins in the weighted table wherein the associated relative weight is selected to skew a likelihood of the winning time being in a certain section of the bonus cycle;

randomly selecting, by the bonus server, a winning time increment from the winning bin; and awarding a bonus prize to a player of one of the plurality of gaming devices after the winning time increment has been reached.

2. A method according to claim 1, further comprising selecting an initial prize value at a first time of the bonus period.

3. A method according to claim 2, further comprising adding a subsequent value to the initial prize value selected during the bonus period.

4. A method according to claim 3, wherein the subsequent value is randomly selected from a table of weighted values.

5. A method according to claim 3, further comprising adding a subsequent value to the initial prize value one or more times during the bonus period.

6. A method according to claim 5, wherein the subsequent value is added to the initial prize value at random times during the bonus period.

7. A method according to claim 6, wherein the random times are selected from a table of weighted times.

8. A method according to claim 3, wherein the subsequent value is selected by an operator.

9. A method according to claim 1, further comprising displaying a value of the bonus prize during at least a portion of the bonus period.

10. A method according to claim 9, wherein displaying the prize value comprises rolling up the subsequent value over a time interval.

11. A method according to claim 9, further comprising displaying an initial prize at a first time increment of the plurality of time increments.

12. A method according to claim 1, further comprising selecting a paytable with relative weighting for each bin.

13. A method according to claim 1, wherein randomly selecting a winning bin comprises selecting a random number between one and a sum of bin weights, and randomly selecting a winning time increment comprises selecting another random number between one and the total number of time increments in the winning bin.

14. A method of operating a plurality of gaming devices interconnected by a network to a bonus controller, the method comprising:

determining a time period of a bonus cycle;

allocating, by the bonus controller, an equal number of a plurality of equal time increments of a bonus cycle into each of a plurality of bins organized into a weighted table;

using the weighted table to determine a winning bin and a winning time increment of the bonus cycle within the winning bin, the weighted table is selected to skew a likelihood of the winning time being in a certain section of the bonus cycle;

tracking, by the bonus controller, a present time of the bonus cycle;

receiving, by the bonus controller, an identifying signal from each gaming device responsive to play of the gaming devices; and awarding a prize value to a selected gaming device after the winning time increment has elapsed during the bonus cycle.

15. A method according to claim 14, further comprising selecting an initial prize value at a first time of the bonus cycle.

16. A method according to claim 15, further comprising adding a subsequent value to the initial prize value during the bonus cycle.

17. A method according to claim 16, wherein the subsequent value is randomly selected from a table of weighted values.

18. A method according to claim 16, further comprising adding the subsequent value to the initial prize value one or more times during the bonus cycle.

19. A method according to claim 18, wherein the subsequent value is added to the prize value at random times during the bonus cycle.

20. A method according to claim 19, wherein the random times are selectable from a weighted table.

21. A method according to claim 16, wherein the subsequent value added to the initial prize value is selected by an operator.

22. A method according to claim 14, further comprising displaying the prize value during at least a portion of the bonus cycle.

23. A method according to claim 22, wherein displaying the prize value comprises rolling up a subsequent value over a time interval.

24. A method according to claim 22, further comprising displaying an initial prize at a first time.

25. A method according to claim 14, wherein using weighted tables to determine a winning time of a bonus cycle allocating a plurality of time increments of a bonus cycle into a plurality of bins comprises:

selecting a maximum time for the bonus cycle;

dividing the maximum time into the plurality of time increments; and allocating the plurality of time increments to the plurality of bins at a predetermined ratio.

26. A method according to claim 14, wherein receiving the identified signal from each gaming device responsive to play of the gaming devices comprises using the bonus controller to track an amount of money played on each of the plurality of gaming devices.

27. A method according to claim 26, wherein the amount of money played on each gaming device is used as relative weighting when selecting the gaming device to award the prize value to.

28. A method of awarding a bonus prize in a plurality of gaming devices that are linked to a bonus controller, the method comprising:

selecting, by the bonus controller, a maximum time of a bonus cycle;

dividing, by the bonus controller, the maximum time into a selectable number of equal time increments;

assigning equal numbers of time increments to each of a plurality of weighted bins;

randomly selecting one of the weighted bins using the weights to skew a likelihood of the winning time being in a certain section of the bonus cycle;

randomly selecting a winning time increment from the selected weighted bin;

after determining the winning time increment, beginning the bonus cycle at a first time; and after the winning time increment has been reached, awarding the bonus prize to one of the gaming devices linked to the bonus controller.

29. The method of claim 28, wherein the number of weighted bins is selected by an operator.

30. The method of claim 28, wherein a bin's relative weighting is determined by a selectable hard coded paytable.

31. The method of claim 28, wherein the selected bin is determined by randomly selecting a random number between one and a total of all bin weights.

32. The method of claim 28, wherein the winning time increment is determined by randomly selecting a random number between one and a total number of time increments assigned to that bin.

33. The method of claim 28, wherein a maximum length of a time increment is less than a play time of a single game play on a gaming device.

* * * * *